United States Patent [19]

Heckel et al.

[11] 4,271,218

[45] Jun. 2, 1981

[54] PIPE INSULATING JACKET

[75] Inventors: Klaus Heckel, Weinheim; Friedemann Klaffke, Gorxheimertal-Unter-Flockenbach; Walter Umann, Weinheim; Volker Schwarz, Hirschberg, all of Fed. Rep. of Germany

[73] Assignee: Firma Carl Freudenberg, Weinheim, Fed. Rep. of Germany

[21] Appl. No.: 12,923

[22] Filed: Feb. 16, 1979

[30] Foreign Application Priority Data

Feb. 18, 1978 [DE] Fed. Rep. of Germany ....... 2807036

[51] Int. Cl.³ .................... B32B 3/04; B29C 19/00
[52] U.S. Cl. ..................... 428/36; 138/149;
156/215; 156/218; 156/304; 156/54; 428/129;
428/71; 428/76; 428/310; 428/313; 428/458;
428/461
[58] Field of Search ............ 428/36, 313, 310, 461,
428/458, 129, 71, 76; 156/215, 218, 304, 54;
138/149, DIG. 9, 151, 143, 141, 145, 156, 171

[56] References Cited

U.S. PATENT DOCUMENTS

| 3,206,541 | 9/1965 | Jachimowicz | 156/54 |
| 3,614,967 | 10/1971 | Royston | 138/149 |
| 3,687,748 | 8/1972 | Clock et al. | 428/37 |
| 3,916,955 | 11/1975 | Nefferstedt et al. | 138/171 |
| 3,992,237 | 11/1976 | Gerholt et al. | 428/36 |
| 4,023,589 | 5/1977 | Rejeski | 138/156 |

OTHER PUBLICATIONS

Modern Plastics Encyclopedia, "Polyethylene Foam", by Traggeser, vol. 52, No. 10A, pub. 10/75, p. 113.

Primary Examiner—George F. Lesmes
Assistant Examiner—E. Rollins Buffalow
Attorney, Agent, or Firm—Sprung, Felfe, Horn, Lynch & Kramer

[57] ABSTRACT

In a pipe insulating jacket comprising a hollow cylinder made of a soft foamed material and an outer sleeve with abutting edges parallel to the axis of the pipe, the improvement wherein the outer sleeve is formed by a metal foil carrying a heat-softenable coating on its inside, the inside of the metal foil being bonded throughout to the surface of the soft foamed material and in proximity to the abutting edges being welded to itself along its upwardly bent edges. Advantageously the foam is closed-cell crosslinked polyethylene of a bulk density of about 30 kg/m³, the coating is unfoamed uncrosslinked polyethylene about 30μ thick, and the metal foil is an aluminum foil about 18μ thick carrying on its outside a foil of heat-softenable polyester about 5 to 20μ thick.

9 Claims, 1 Drawing Figure

U.S. Patent    Jun. 2, 1981    4,271,218
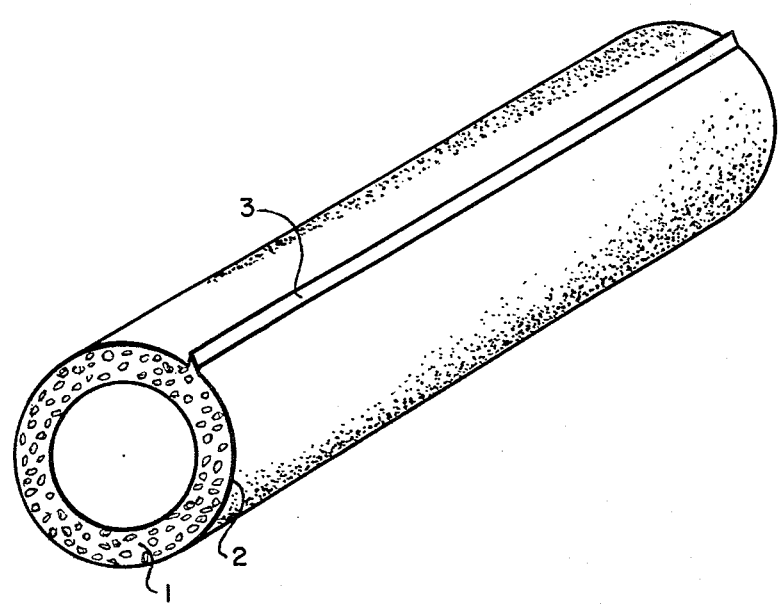

PIPE INSULATING JACKET

The invention relates to an insulating jacket for pipes which comprises a hollow cylinder made of a soft foamed material and an outer sleeve having abutting edges parallel to the axis of the pipe.

From German patent application (DT-AS) No. 1,475,841 a pipe insulating jacket in the form of a hollow cylinder is known which has an outer sleeve in the form of a plastic foil whose abutting edges are parallel to the axis of the pipe and joined by means of a slide fastener or zipper to form a closed unit. However, its impermeability to water-vapor diffusion is inadequate for some applications, particularly when a pipe carrying a cold fluid is to be insulated. With all known insulating materials, after prolonged use water will increasingly collect particularly on the inside, for physical reasons, and this will diminish the insulating effect. This process is retarded considerably when closed-cell foamed materials are used in making the insulating body. Even then, however, a growing concentration of water particularly about the surface facing the cold pipe cannot be avoided over the long run.

It is the object of the invention to develop an insulating jacket which is suited especially for the insulation of pipes carrying cold fluids and which, though easy to manufacture, is rugged enough to withstand external mechanical stresses.

In accordance with the invention, this object is accomplished, in the case of an insulating jacket of the type described above, in that the outer sleeve is a metal foil having on its inside a heat-softenable coating, and that the inside of the metal foil is bonded throughout to the surface of the soft foam and, in proximity to the abutting edges, to itself along its Thus the insulating jacket in accordance with the invention consists of a hoselike jacket made of an insulating material having soft elastic properties. The surface of this hoselike jacket is covered throughout by the metal foil, whereby a vapor-diffusion resistance factor greater than 20,000 is obtained. The permeability coefficient is less than $10^{-6}$ g/m/h/mm Hg, which means that it forms a very effective barrier to liquids and gases.

With regard to mechanical properties, it is of particular importance that the outer sleeve formed by a metal foil is provided on its inside with a heat-softenable coating. Through this coating, excellent bonding to the insulating material is obtained and the capacity of the insulating jacket to take bending, which is unavoidable when the jacket is slipped onto pipe elbows for example, is substantially improved.

Because of their crystalline structure, the metal foils used intrinsically do not possess adequate mechanical strength so far as bending of the insulating jacket is concerned, and these strength properties cannot be sufficiently improved by varying the thickness of the metal foils. In accordance with the invention, however, the tensile stresses resulting from bending are dissipated through the coating consisting of a heat-softenable plastic with which the foil is provided. In principle a coating on the inside of the foil will suffice, and this coating will serve at the same time for bonding to the insulating body. In many cases it has been found advantageous to line the foil also on the outside with a further plastic foil. It will suffice if this outer cover is thinner than the foil applied to the inside. In any case, excellent distribution of the arising stresses over a larger area of the metal foil is secured. As a result, the insulating jacket in accordance with the invention may be slipped onto pipes having a relatively small radius of curvature without the danger of breaks occurring in the diffusion barrier.

In a special variant, the metal foil is an aluminum foil of a thickness between about 10 and 40$\mu$, and preferably of a thickness of about 18$\mu$. The outside of this foil is preferably lined with a thermoplastic polyester of a thickness ranging from about 5 to 20$\mu$ while for the inside polyethylene foils of a thickness between about 20 and 50$\mu$ have proved particularly suitable.

In another special variant, the soft foam and the coating on the inside of the metal foil consist of related plastics. It has been found particularly advantageous to use as soft foam a closed-cell foamed crosslinked polyolefin and as coating an unfoamed, uncrosslinked polyolefin. Polyethylenes in particular are used as polyolefins. For production of the soft foam, a bulk density of about 20 to 50 kg/m$^3$ has proved particularly satisfactory, and for the thickness of the coating on the inside of the foil, values from about 10 to 50$\mu$. In a preferred embodiment, a soft foam having a bulk density of about 30 kg/m$^3$ and a coating thickness of about 30$\mu$ are used. The length of the insulating jacket is not limited.

The FIGURE shows an exemplified embodiment of the insulating jacket in accordance with the invention in a perspective view.

The insulating body as such, which preferably consists of a closed-cell, crosslinked polyethylene foam, is designated 1. The outside surface of the insulating body is welded throughout to an unfoamed polyethylene foil disposed on the inside of an aluminum foil 2. In proximity to the butt edge 3, the aluminum foil is bent up at both ends so that the insides with the unfoamed polyethylene foil abut each other. These foils are then welded to each other by the use of heat and pressure, and this results in an absolutely gas- and vaportight closure of the sleeve. The special advantage of this particular design of the butt edge is that it permits perfectly uniform bonding of the surfaces welded to each other with simultaneous exertion of an initial-tension force on the circumference of the insulating jacket, which as a result is uniformly pretensioned in the radial direction. Initial tensions differing from one area to the next, which would be unavoidable if the sleeve were produced in the manner of a spirally wound pipe, are thus ruled out.

The metallic sleeve of the insulating jacket in accordance with the invention possesses exceptionally high strength with respect to mechanical stresses which, as tensile stresses, for example, are unavoidable when the insulating jacket is bent. This high strength is largely due to the fact that the tensile stresses which arise are distributed by the direct-laminated foils over a larger area of the metal foil, which prevents a necking down followed by fracture in a very narrowly limited area. The insulating jacket in accordance with the invention may therefore be slipped onto pipe elbows having a relatively small radius of curvature without running a risk that the desired diffusion barrier will be impaired. The cross ribbing occasionally observable in the surface following such sharp bending is due to a thickness reduction over a larger area and does not result in an appreciable impairment of the original diffusion barrier.

In a preferred embodiment, an insulating jacket comprises an 18$\mu$ aluminum foil carrying a thermoplastic polyester film 10$\mu$ thick on its outside and bonded on its inside to a closed-cell crosslinked polyethylene foam 1 cm thick and having a bulk density of 30 kg/m$^3$, bonding being effected by an unfoamed uncrosslinked polyethylene film 30μ thick.

It will be appreciated that the instant specification and example are set forth by way of illustration and not limitation, and that various modifications and changes may be made without departing from the spirit and scope of the present invention.

What is claimed is:

1. A pipe insulating jacket consisting of a hollow cylinder made of a soft closed cell foamed cross-linked polyolefin, and outer sleeve of aluminum foil with abutting edges parallel to the axis of the pipe, and a polyester further foil about 5 to 20μ thick on the outside of the aluminum foil, the aluminum foil carrying a thermoplastic coating on its inside, the coating being welded throughout to the surface of the soft foamed material and in proximity to the abutting edges being welded to itself along its upwardly bent edges.

2. An insulating jacket according to claim 1, wherein the aluminum foil is about 10 to 40μ thick.

3. An insulating jacket according to claim 1, wherein the soft foamed material and the coating on the inside of the aluminum foil are of chemically similar plastics.

4. An insulating jacket according to claim 3, wherein the coating material is an unfoamed uncross-linked polyolefin.

5. An insulating jacket according to claim 4, wherein the polyolefins of the foamed and unfoamed materials are polyethylenes.

6. An insulating jacket according to claim 4, wherein the soft foamed material has a bulk density of about 20 to 50 kg/m$^3$ and the inner coating has a thickness from about 10 to 50μ.

7. An insulating jacket according to claim 5, wherein the soft foamed material has a bulk density of about 30 kg/m$^3$; the inner coating a thickness of about 30μ, and the aluminum foil is about 18μ thick.

8. A pipe insulated with a jacket according to claim 1.

9. A pipe insulated with a jacket according to claim 7.

* * * * *